(12) United States Patent
Nurse, Jr.

(10) Patent No.: US 6,592,755 B1
(45) Date of Patent: Jul. 15, 2003

(54) SYSTEM FOR TREATING WASTEWATER

(76) Inventor: Harry L. Nurse, Jr., 12207 Plantation Blvd., Goshen, KY (US) 40026

( * ) Notice: Subject to any disclaimer, the term of this patent is extended or adjusted under 35 U.S.C. 154(b) by 0 days.

(21) Appl. No.: 09/834,318

(22) Filed: Apr. 13, 2001

(51) Int. Cl.[7] .................................................. C02F 3/00
(52) U.S. Cl. ........................ 210/150; 210/196; 210/170; 210/195.1
(58) Field of Search ................................ 210/615–617, 210/150, 170, 532.2, 195.1, 196, 197

(56) References Cited

U.S. PATENT DOCUMENTS

| | | | | |
|---|---|---|---|---|
| 4,919,331 A | * | 4/1990 | Kosik et al. | 239/2.2 |
| 5,217,616 A | * | 6/1993 | Sanyal et al. | 210/150 |
| 5,707,513 A | | 1/1998 | Jowett | |
| 5,762,784 A | | 6/1998 | Jowett | |
| 5,762,793 A | * | 6/1998 | Nurse, Jr. | 210/323.2 |
| 5,980,739 A | | 11/1999 | Jowett | |
| 6,153,094 A | * | 11/2000 | Jowett et al. | 210/151 |
| 6,190,548 B1 | * | 2/2001 | Frick | 210/170 |

* cited by examiner

*Primary Examiner*—Chester T. Barry
(74) *Attorney, Agent, or Firm*—Charles G. Lamb; Middleton Reutlinger

(57) ABSTRACT

A wastewater treatment system includes a septic tank having a discharge in flow communication with a plurality of biofilter containers having filter media therein. Wastewater or effluent from the septic tank is allowed to trickle downwardly through the filter media and each container includes an outlet for discharging the wastewater to the environment or transferred to other treatment facilities.

13 Claims, 3 Drawing Sheets

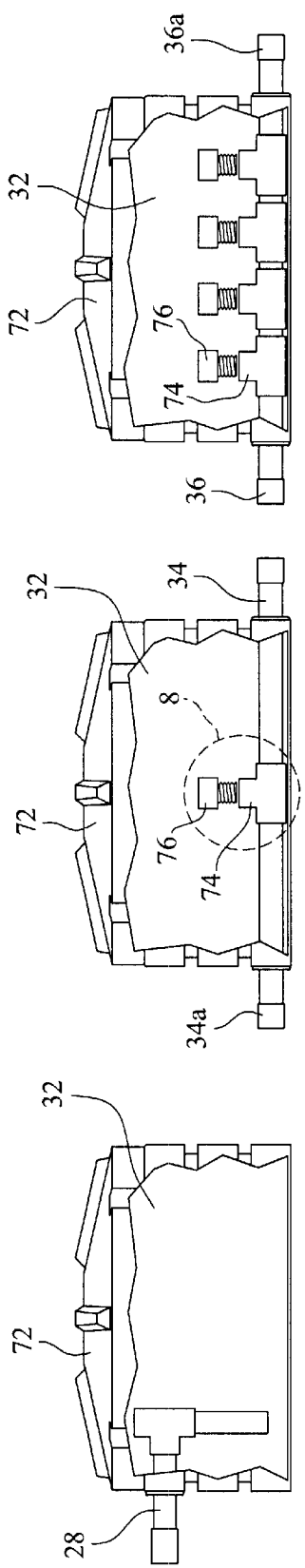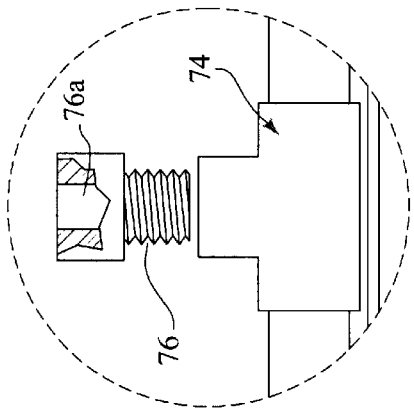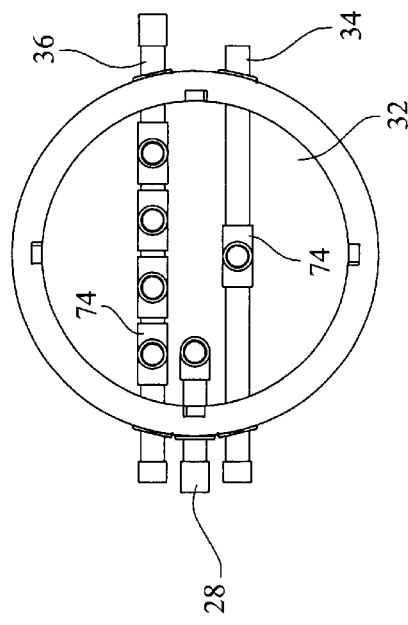

SYSTEM FOR TREATING WASTEWATER

BACKGROUND OF THE INVENTION

This invention relates to a system for treating wastewater and more particularly for the treatment of wastewater including the use of filtering materials as aerobic biofilters in a biofilter treatment tank.

In the treatment of wastewater, such as sewage and the like, it is common to provide a septic tank with an inlet in an upper portion to receive the wastewater. The septic tank is provided with, and generally on the opposite side from the inlet, an outlet discharge which is in flow communication with laterals for discharging effluent into an open field or the like. In the septic tank, the particulate materials settle to the bottom and it is the effluent which is removed through the laterals. Moreover, it has become common practice to install filters at the outlet discharge from the septic tank to remove undissolved solid particulate materials thereby preventing said materials from entering into the lateral field.

In recent years, it has been suggested to even further treat effluent from a septic tank before the wastewater is left to the environment. For example, U.S. Pat. No. 5,980,739 to Jowett et al teaches a wastewater treatment system including an aerobic filter medium, particularly polyurethane foam particles and the like, as a biofilter. Also, U.S. Pat. No. 5,762,784 also to Jowett et al teaches a water treatment apparatus which includes a container having apertures through the walls thereof and being opened to the atmosphere filled with open celled foam material for use in the treatment of wastewater.

SUMMARY OF THE INVENTION

It is an object of the present invention to provide a wastewater treatment system to treat organic matter, solids, and pathogens.

It is also an object of the present invention to provide a wastewater treatment system for treatment of organic matter, solids, and pathogens which is relatively inexpensive and easy to install and maintain.

More particularly, the present invention is directed to a method for treating wastewater wherein water received within a septic tank is either pumped or gravity fed to a container having a body of filter material therein wherein the wastewater is generally sprayed along the top of the body of filter material and is allowed to percolate slowly downwardly therethrough. The filtered wastewater is collected in the bottom of the container and then transferred by pump or gravity into laterals, or the like, or to other parts of the environment, or is recycled for further treatment.

Even more particularly, the present invention is directed to a wastewater treatment system which includes a septic tank in flow communication with at least one container having a body of filter material therein. An inlet to the container is in flow communication with an outlet from the septic tank. The inlet to the container includes spray nozzles to spray effluent over the body of filter material into the at least one container, the inlet including a conduit extending along the upper portion of the container. The filter material is preferably open-cell foam material in randomly stacked cubes within the container which provides for a filter medium having large openings or spaces therein so that the growth of biomatter does not plug nor unduly interfere with the filtration of the wastewater as it descends or percolates downwardly therethrough. Moreover, the container is a solid wall container with a lid loosely placed thereon or includes an opening in the lid so that there is an adequate supply of oxygen into the container to assist in the degradation of the organic matter and pathogens therein. The system may also include a recycle tank having an inlet in flow communication with the outlet from at least one container wherein the recycle tank includes two outlet conduits, one in flow communication with the septic tank and the other in flow communication with the environment or is transferred for further treatment.

A better understanding of the invention may be obtained by consideration of the drawings and the detail of a preferred embodiment set forth hereinafter.

BRIEF DESCRIPTION OF THE DRAWINGS

FIG. 4 is a first side view, with selected portions cutaway, of a recirculating tank of the present invention;

FIG. 5 is a second side view, with selected portions cutaway, of the recirculating tank of FIG. 4;

FIG. 6 is a third side view, with selected portions cutaway, of the recirculating tank of FIG. 4;

FIG. 7 is a top view of the recirculating tank of FIG. 4; and,

FIG. 8 is an enlarged side view, with selected portions cutaway, of the inverted "T" connections in the outlet conduits in the recirculating tank of FIG. 4.

DETAILED DESCRIPTION OF THE PREFERRED EMBODIMENT

Figure 1:
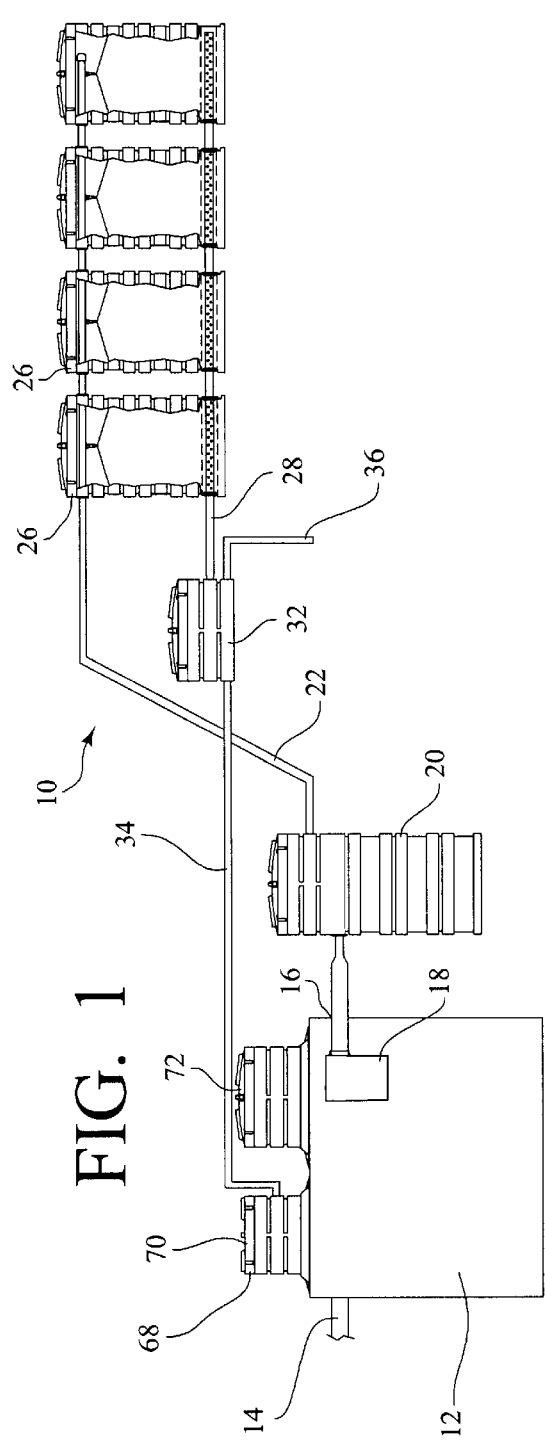
FIG. 1 is a generally schematic view one preferred wastewater system of the present invention.
Figure 2:
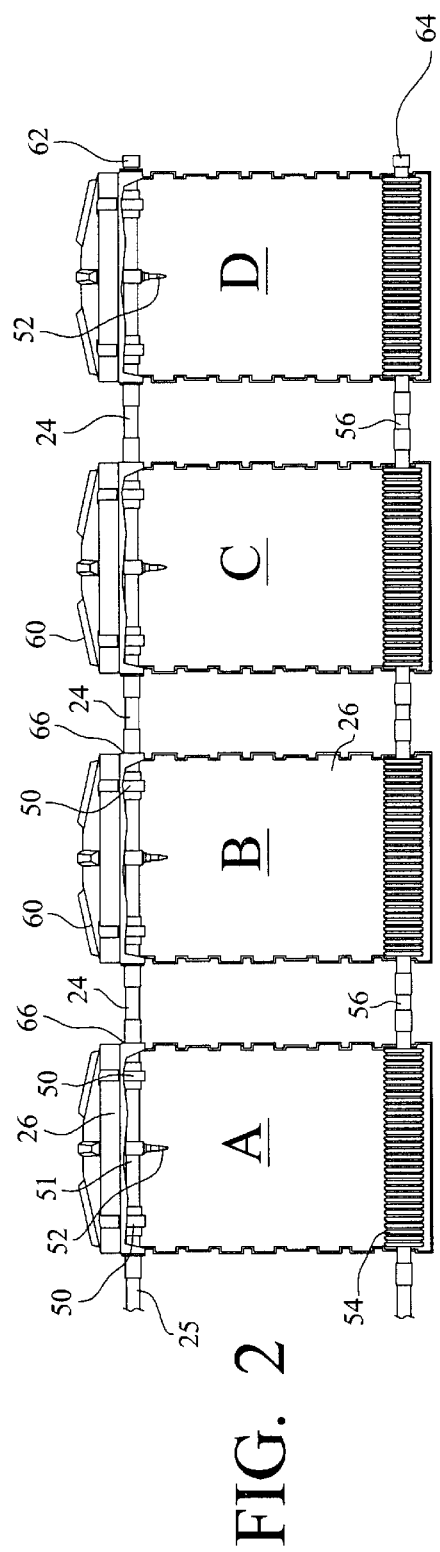
FIG. 2 is an enlarged side sectional view of a plurality of containers, including the filter medium of the present invention.

As best shown in FIG. 1, a wastewater treatment system of the present invention includes septic tank 12 which receives wastewater effluent, including organic matter, pathogens, and other particulates. An inlet 14 is provided for receiving the wastewater into the septic tank 12 and an outlet 16 is provided for the discharge of wastewater therefrom. Tanks 12 are generally provided with a filter 18 attached to outlet 16 which removes most of the particulates from the wastewater that have not settled out or have broken down from the anaerobic activity occurring within the tank 12. The filter 18 may be any well known filter which is commercially available, such as the Zabel Industries's A1800 filter. The effluent, by gravity, flows from the tank 12 through the outlet 16 into a transfer or holding tank 20. Tank 20 generally includes a pump, not shown, for pumping the effluent into a plurality of biotreatment containers 26 by way of conduit 22. It is realized that the effluent may be transferred from tank 20 to containers 26 by other means such as gravity, if appropriate. As best shown in FIG. 2, the biotreatment containers 26 are connected in series wherein effluent pumped from effluent transfer tank 20 enters the biotreatment containers 26 through an inlet pipe 25 into a first biotreatment container 26 identified by the letter A. As shown in FIG. 2, there are four containers 26 and each container is identified by the letters A, B, C, and D, with a coupling 24 disposed thus between with appropriate fittings, such as quick disconnects 50 and grommets 66 for quick connection and disconnection between the containers.

However, other connections may be utilized in connecting the inlet effluent piping into the containers. Generally, the containers 26 are 55 gallon solid wall polyethylene drums which are relatively inexpensive and easily obtainable commercially and require a relatively small space. Each of the containers 26 is provided with at least one lid 60, generally an innerlocking lid, and in many instances, two lids 60 are utilized for each container 26. In use, lids 60 are not sealed or tightened, or include air flow-through openings therein as a small portion of air is desired within the container to assist in the aerobic degradation of organic matter and pathogens in the effluent.

Figure 3:
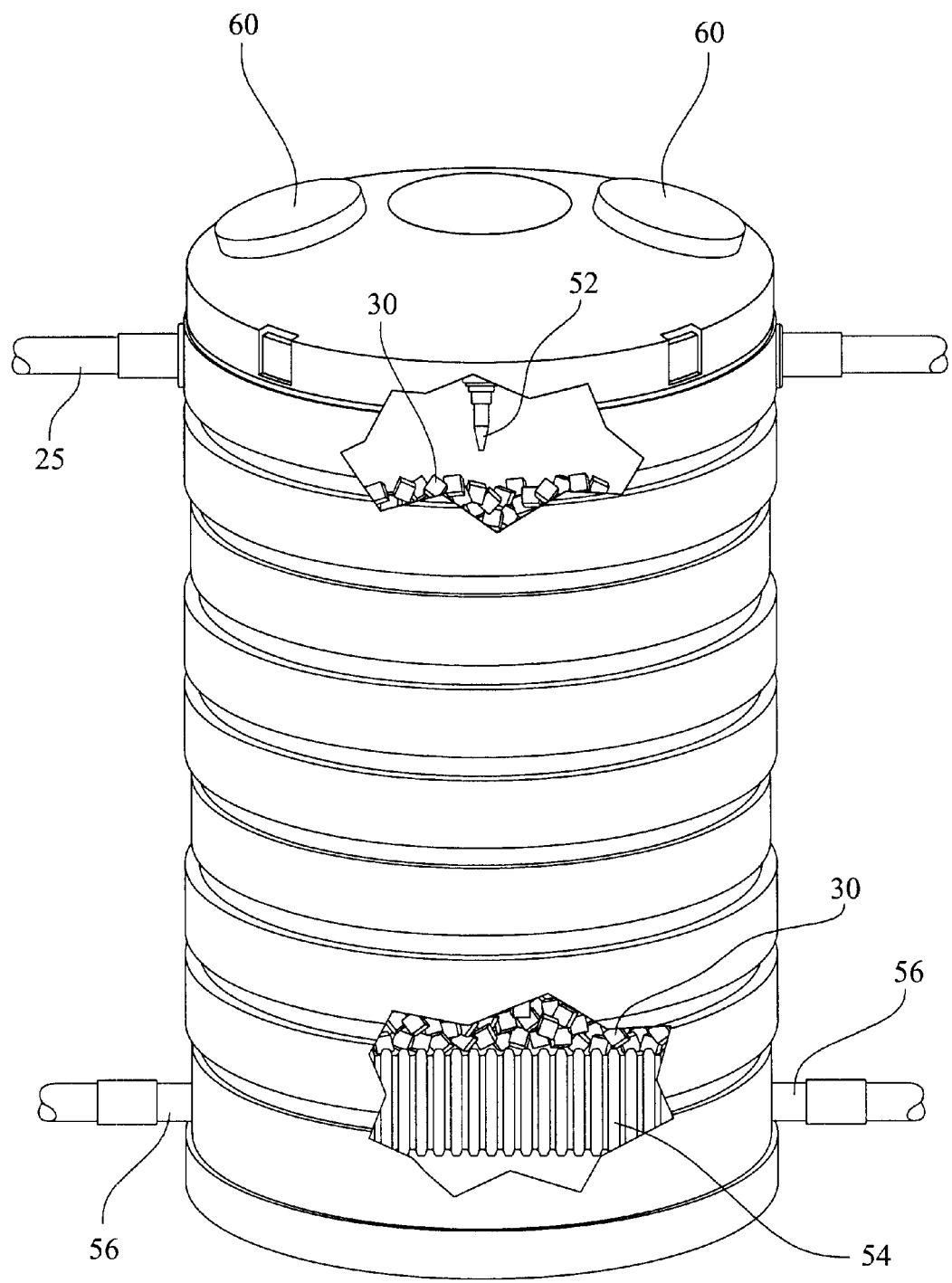
FIG. 3 is an enlarged perspective view, with selected portions cut away, of a preferred container with filter medium therein of the present invention.

The containers 26, as best shown in FIG. 3 in a preferred embodiment includes 2"×2"×2" polyurethane foam cubes or blocks as a filter media or material for the effluent. Other filter media, such as organic peat or inorganic materials, such as sand or gravel may also be used. Within each container 26 and disposed between the quick disconnects 50 is a conduit 51 with a spray nozzle 52 therein. A preferred spray nozzle 52 is a BETE spray nozzle and a preferred sizing of the piping for the 55 gallon containers 26 is 1.25" schedule 40 PVC conduits. The containers 26 are connected in series and on the end of the coupling extending beyond the last container 26, identified by the letter D, is a plug or cap 62.

Disposed along the bottom of the containers 26 is a discharge conduit piping arrangement which includes a plurality of couplings 56 disposed between each of the containers 26 and is connected to perforated pipes 54 which are disposed along the bottom of the biotreatment containers 26. Preferably the couplings will be of 1.25" schedule 40 PVC and the perforated pipes 54 which are attached to the couplings 56 generally have a diameter of approximately 4" so as to provide a sufficient receiver for the effluent as it trickles down through the biotreatment cubes 30.

Referring back to FIG. 1, disposed between the biotreatment container 26 "A" and recirculating tank 32, is the discharge conduit 28. The recirculating tank 32 receives the biotreated wastewater from the containers 26 and is provided with two outlets, one outlet being a recirculating line 34 which recirculates a preselected amount of effluent to the septic tank 12 for further treatment and another outlet being a discharge conduit 36 which provides the means for the transfer of effluent for either further treatment or to laterals in an open field. The recirculating line 34 is in flow communication with the inlet into a riser 68 having a lower portion open into the septic tank 12. The riser 68 generally extends upward from the septic tank 12 and is provided with a cover 70 at approximately ground level. The septic tank 12 is also provided with an inlet manhole opening 72 which is disposed directly above the filter 18 for easy access into the septic tank 12 and removal or installation of filter 18.

As shown in FIGS. 4–8, a preselected recirculating tank 32 is provided with an inlet 28 which enters the recirculating tank 32 in an upper portion of the tank and the outlets 34 and 36 are provided with a plurality of inverted T-connections 74 therein with an adjustable vertically extending conduit portion 76 having a fluid inlet through-bore 76a. Vertical positioning of inlet 76a determines the quantity of wastewater that will be sent to a lateral for further treatment through line 36 or recirculates back to the septic tank 12 through line 34. As shown, the outlet 34 is provided with one T-connection 74 and the outlet 36 is provided with four T-connections 74. Thus, when the conduit portions 76 are threadably received within the body of the T-connections 74 and adjusted so the inlets 76a are at the same height as the top of the other inlets 76a, in the lines 34 and 36, then each T-connection handles the same amount of flow as the remaining T-connections. Thus, in the described embodiment, 20% of the wastewater will be discharged through line 34 and 80% of the wastewater will be discharged through line 36.

In operation, wastewater discharge enters the septic tank 12 through the wastewater inlet 14 wherein the wastewater is subjected to an anaerobic treatment within the tank 12 and also the solids within the wastewater are given an opportunity to settle to the bottom of the tank 12. The effluent, by gravity, then flows through the filter 18, out through the discharge 16 and into the transfer tank 20. The anaerobically treated effluent is then pumped through conduit 22 into the plurality of biotreatment containers 26 wherein the wastewater is then sprayed through nozzles 52 onto the foam cubes 30 or other filter media thereby allowing the wastewater to percolate slowly downwardly through the filter media thereby allowing for microbiological activity to take place within the container. Generally, the lids on the container are not sealed, or other air flow inlets are provided to allow a sufficient amount of air to enter the container to provide the oxygen necessary for the aerobic treatment as the wastewater percolates downwardly therethrough. Aerobically treated wastewater collects at the bottom of the container and then, by gravity, flows outwardly through outlet conduit 28 to the recirculating tank 32 wherein a preselected amount of treated effluent is returned to the tank 12 and the remainder is discharged into laterals or for other treatment.

It will be realized that various changes may be made to the specific embodiment shown and described without departing from the principals and spirit of the present invention.

What is claimed is:

1. A wastewater treatment system comprising:
    a septic tank having an inlet and an outlet;
    a biofilter container having a body of open cell foam material therein, said container being in flow communication with said outlet from said septic tank;
    said container having an inlet conduit in an upper portion in flow communication with said outlet from said septic tank, said inlet conduit having a discharge opening therein positioned downwardly into said container, said inlet conduit including a spray nozzle therein, said spray nozzle directing wastewater over an upper layer of said body of said filter media; and
    said container having an outlet conduit, said outlet conduit having a plurality of openings therein to receive filtered water.

2. The system of claim 1, said filter media being an open cell foam material.

3. The system of claim 2 wherein said body of said open cell foam material is a polyurethane foam.

4. The system of claim 1, said filter media being organic peat.

5. The system of claim 1, said filter media being an inorganic filter media.

6. The system of claim 5, said inorganic filter media being sand, gravel, or a combination thereof.

7. The system of claim 1, including a recirculating tank having an inlet in flow communication with said container outlet conduit and at least two outlets, one outlet being in flow communication with said septic tank.

8. The system of claim 7, said recirculating tank having at least two outlets including conduits disposed along a bottom of said recirculating tank, each said conduit having at least one inverted T-connection with an adjustable vertically extending fluid inlet channel, said inlet channel being open to said container.

9. The system of claim 1 includes a filter in said septic tank.

10. The system of claim 1 including a transfer tank and a pump therein between said discharge outlet from said septic tank and the inlet conduit into said container.

11. The system of claim 1 including a plurality of biofilter containers disposed in a series arrangement.

12. In a wastewater treatment system having a septic tank in flow communication with a biofilter container, a recycle tank is disposed in flow communication with an outlet from the biofilter container, the improvement comprises: at least two outlet conduits from said recycle tank, one of said outlets being in flow communication with said septic tank, each said outlet from said recycle tank having at least one T-connection with an adjustable vertically extending fluid inlet channel open to the bottom of said recirculating tank.

13. A wastewater treatment system comprising:
a septic tank having an inlet and an outlet;
a biofilter container having a body of filter media therein, said container being in flow communication with said outlet from said septic tank;
said container having an inlet conduit in an upper portion in flow communication with said outlet from said septic tank, said inlet conduit having a discharge opening therein positioned downwardly into said container;
said container having an outlet conduit, said outlet conduit having a plurality of openings therein to receive filtered wastewater; and
a recirculating tank having an inlet in flow communication with said container outlet conduit and at least two recirculating tank outlets, one recirculating tank outlet being in flow communication with said septic tank, said at least two recirculating tank outlets including recirculating tank conduits disposed along a bottom of said recirculating tank, each said recirculating tank conduit having at least one inverted T-connection with an adjustable vertically extending fluid inlet channel, said inlet channel being open to said container.

* * * * *